(12) United States Patent
Eo et al.

(10) Patent No.: US 10,174,812 B2
(45) Date of Patent: Jan. 8, 2019

(54) TRANSMISSION FOR VEHICLE

(71) Applicant: Hyundai Motor Company, Seoul (KR)

(72) Inventors: Soon Ki Eo, Ansan-si (KR); Chon Ok Kim, Yongin-si (KR); Chae Hong Lim, Seoul (KR)

(73) Assignee: Hyundai Motor Company, Seoul (KR)

( * ) Notice: Subject to any disclaimer, the term of this patent is extended or adjusted under 35 U.S.C. 154(b) by 603 days.

(21) Appl. No.: 14/948,281

(22) Filed: Nov. 21, 2015

(65) Prior Publication Data

US 2017/0059007 A1 Mar. 2, 2017

(30) Foreign Application Priority Data

Sep. 2, 2015 (KR) ........................ 10-2015-0124015

(51) Int. Cl.
*F16H 3/10* (2006.01)
*F16H 3/093* (2006.01)
*F16H 3/00* (2006.01)
*F16H 3/097* (2006.01)

(52) U.S. Cl.
CPC ............. *F16H 3/093* (2013.01); *F16H 3/006* (2013.01); *F16H 3/097* (2013.01); *F16H 3/10* (2013.01); *F16H 2003/007* (2013.01); *F16H 2200/006* (2013.01)

(58) Field of Classification Search
CPC ............. F16H 3/093; F16H 3/097; F16H 3/10
USPC .................................................. 74/325, 330
See application file for complete search history.

(56) References Cited

U.S. PATENT DOCUMENTS

2007/0289399 A1 12/2007 Tanba et al.

FOREIGN PATENT DOCUMENTS

| JP | 2010-162923 A | 7/2010 |
|---|---|---|
| JP | 4719599 B2 | 7/2011 |
| KR | 10-2009-0132758 A | 12/2009 |
| KR | 10-2013-0104387 A | 9/2013 |

*Primary Examiner* — William C Joyce
(74) *Attorney, Agent, or Firm* — Morgan, Lewis & Bockius LLP

(57) ABSTRACT

A transmission for a vehicle may include a first input shaft continuously receiving rotational power from a power source; a second input shaft selectively receiving the rotational power of the power source through a clutch; a first counter shaft and a second counter shaft connected to the first input shaft and the second input shaft through a transfer gear pair, respectively; a controlling device selecting the transfer gear pair to transfer the rotational power from the first input shaft and the second input shaft to the first counter shaft and the second counter shaft; a one-way clutch allowing the rotational power provided to the first input shaft to be transferred only from the first input shaft toward the first counter shaft.

10 Claims, 10 Drawing Sheets

TRANSMISSION FOR VEHICLE

CROSS REFERENCE TO RELATED APPLICATION

The present application claims priority to Korean Patent Application No. 10-2015-0124015, filed on Sep. 2, 2015, the entire contents of which are incorporated herein for all purposes by this reference.

BACKGROUND OF THE INVENTION

Field of the Invention

The present invention relates to a transmission for a vehicle, and more particularly, to a transmission for a vehicle capable of improving a shifting quality deterioration phenomenon felt as if the vehicle is drawn during being shifted.

Description of Related Art

An automatic manual transmission may automatically perform shifting by an actuator during a period in which a vehicle is driven to provide driving convenience similar to that of an automatic transmission, and may have power transfer efficiency more excellent than that of the automatic transmission to contribute to improvement of fuel efficiency of the vehicle.

However, in the case of an automatic manual transmission based on a synchro-mesh type shifting mechanism, an instant in which power of an engine is interrupted at the time of shifting a gear even during a period in which the shifting is automatically performed by the actuator is inevitably present. Therefore, a torque decrease is generated, such that a shifting quality deterioration phenomenon felt as if the vehicle is drawn rearward is generated.

In order to solve the problem as described above, a technology of installing a planetary gear device between the engine and the synchro-mesh type shifting mechanism to select a power transfer path of the engine depending on a driving state of the vehicle and transfer the power to an output shaft has been suggested.

The contents described as the related art have been provided only for assisting in the understanding for the background of the present invention and should not be considered as corresponding to the related art known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for a vehicle capable of improving a shifting quality deterioration phenomenon felt as if the vehicle is drawn during being shifted.

According to an exemplary embodiment of the present invention, there is provided a transmission for a vehicle, including: a first input shaft continuously receiving rotational power from a power source; a second input shaft selectively receiving the rotational power of the power source through a clutch; a first counter shaft and a second counter shaft connected to the first input shaft and the second input shaft through transfer gear pairs, respectively; a controlling device selecting one of the transfer gear pairs to transfer the rotational power from the first input shaft to the first counter shaft or to transfer the rotational power from the second input shaft to the second counter shaft; a one-way clutch allowing the rotational power provided to the first input shaft to be transferred only from the first input shaft toward the first counter shaft; and a shifting device part including a plurality of shifting gear pairs, selecting one of the shifting gear pairs appropriate for a driving speed by one of synchronous devices, and transmitting the power provided from the power source to the output shaft, wherein the shifting gear pairs include: a plurality of sub-shifting gear pairs provided on the first counter shaft and the output shaft so as to have different gear ratios; and a plurality of main-shifting gear pairs provided on the second counter shaft and the output shaft so as to have different gear ratios, the shifting gear pairs are configured so that the same gear ratios are present between total gear ratios from the first input shaft to the output shaft trough the sub-shifting gear pairs and total gear ratios from the second input shaft to the output shaft through the main-shifting gear pairs, and the synchronous devices include a center synchronous device provided between the first input shaft and the output shaft so as to be directly connectable to the first input shaft and the output shaft to allow the rotational power transferred to the first input shaft to be directly transferred to the output shaft.

The one-way clutch may be provided between an input transfer gear forming a transfer gear pair of the transfer gear pairs provided on the first input shaft and the first input shaft.

The transfer gear pair may include: a first transfer gear pair including a first input transfer gear of the first input shaft and a first output transfer gear of the first counter shaft provided as a pair; and a second transfer gear pair including a second input transfer gear of the second input shaft and a second output transfer gear of the second counter shaft provided as a pair, and the controlling device may include: a first transfer controlling device to select the first transfer gear pair; and a second transfer controlling device to select the second transfer gear pair.

The first transfer controlling device may be provided on the first counter shaft and be engaged with and coupled to the first output transfer gear, and the second transfer controlling device may be provided on the second counter shaft and be engaged with and coupled to the second output transfer gear.

The sub-shifting gear pairs and the main-shifting gear pairs may include shifting gear pairs having the same gear ratio.

The shifting gear pairs having the same gear ratio may be shifting gear pairs having a gear ratio of a specific gear ratio or more.

The sub-shifting gear pairs and the main-shifting gear pairs may be configured to share output gears provided on the output shaft with each other.

The shifting gear pairs may be configured so that the same gear ratios are present between total gear ratios of combined the first transfer gear pair and the sub-shifting gear pairs and total gear ratios of combined the second transfer gear pair and the main-shifting gear pairs.

The center synchronous device may be provided on the output shaft and be selectively coupled to the first input shaft to implement a gear ratio of 1:1.

The synchronous device may include: a 1 and 2-stage sub-shifting synchronous device selecting a 1-stage sub-shifting gear pair or a 2-stage sub-shifting gear pair; a 1 and R-stage main-shifting synchronous device selecting a 1-stage main-shifting gear pair or an R-stage main-shifting gear pair; a 2 and 5-stage main-shifting synchronous device selecting a 2-stage main-shifting gear pair or a 5-stage main-shifting gear pair; and a 3 and 4-stage main-shifting synchronous device selecting a 3-stage main-shifting gear pair or a 4-stage main-shifting gear pair, and the center synchronous device may select a 3-stage sub-shifting gear pair or be coupled to the first input shaft to implement 4-stage sub-shifting.

According to another exemplary embodiment of the present invention, there is provided a transmission for a vehicle, including: a first input shaft continuously receiving rotational power from a power source; a second input shaft selectively receiving the rotational power of the power source through a clutch; a first counter shaft and a second counter shaft connected to the first input shaft and the second input shaft through transfer gear pairs, respectively; a controlling device selecting the transfer gear pairs to transfer the rotational power from the first input shaft to the first counter shaft or to transfer the rotational power from the second input shaft to the second counter shaft; a one-way clutch allowing the rotational power provided to the first input shaft to be transferred only from the first input shaft toward the first counter shaft; and a shifting device part including a plurality of shifting gear pairs provided on the first counter shaft, the second counter shaft, and an output shaft thereamong, selecting a shifting gear pair appropriate for a driving speed by one of synchronous devices, and transmitting the power provided from the power source to the output shaft, wherein the shifting gear pairs include: a plurality of sub-shifting gear pairs provided on the first counter shaft and the output shaft so as to have different gear ratios; and a plurality of main-shifting gear pairs provided on the second counter shaft and the output shaft so as to have different gear ratios, the shifting gear pairs are configured so that the same gear ratios are present between total gear ratios from the first input shaft to the output shaft through the sub-shifting gear pairs and total gear ratios from the second input shaft to the output shaft through the main-shifting gear pairs, and the synchronous devices include: a 1 and 4-stage sub-shifting synchronous device selecting a 1-stage sub-shifting gear pair or a 4-stage sub-shifting gear pair; a 2 and 3-stage sub-shifting synchronous device selecting a 2-stage sub-shifting gear pair or a 3-stage sub-shifting gear pair; a 1 and R-stage main-shifting synchronous device selecting a 1-stage main-shifting gear pair or an R-stage main-shifting gear pair; a 2 and 3-stage main-shifting synchronous device selecting a 2-stage main-shifting gear pair or a 3-stage main-shifting gear pair; and a 4 and 5-stage main-shifting synchronous device selecting a 4-stage main-shifting gear pair or a 5-stage main-shifting gear pair.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
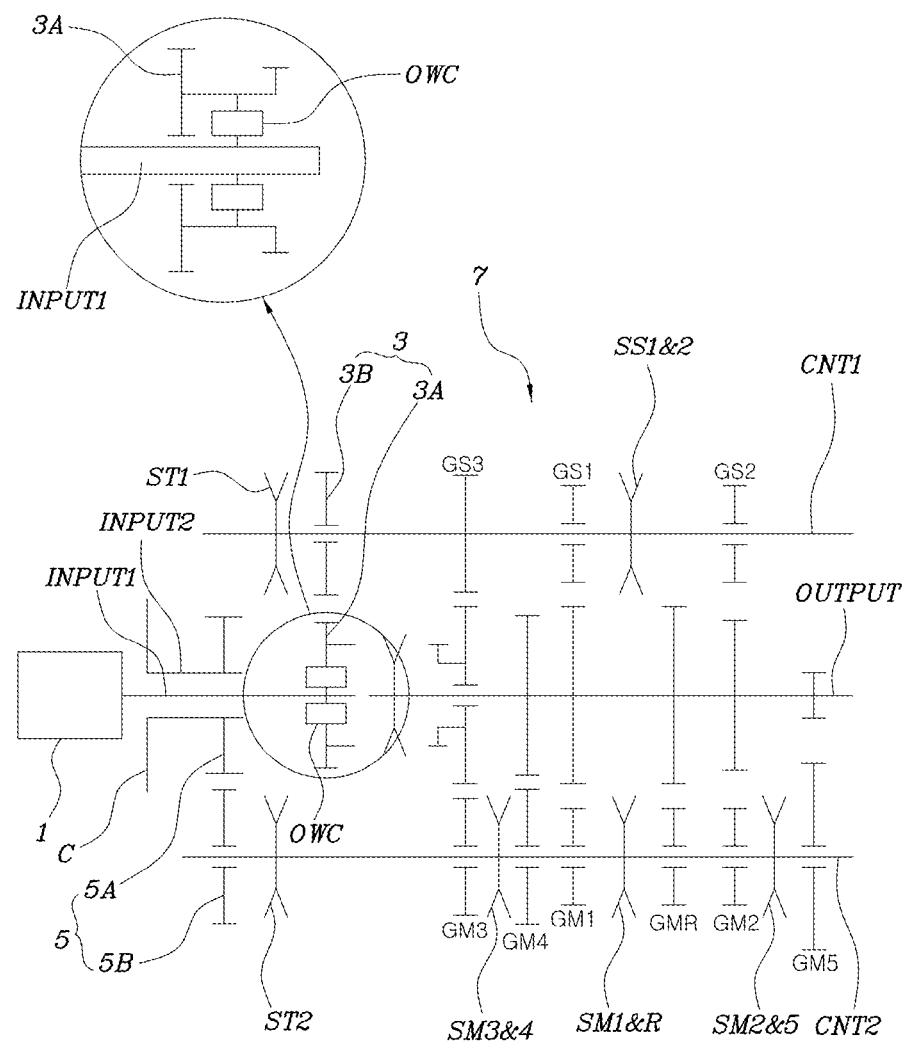
FIG. 1 is a view schematically illustrating an entire structure of a transmission for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will be described in detail with reference to the accompanying drawings.

A transmission for a vehicle according to an exemplary embodiment of the present invention may be configured to include a first input shaft INPUT1, a second input shaft INPUT2, a first counter shaft CNT1, a second counter shaft CNT2, a controlling device, a one-way clutch OWC, and a shifting device part 7.

The present invention will be described in detail with reference to FIG. 1. The first input shaft INPUT1 may have a power source connected to one end thereof and continuously receive rotational power from the power source to thereby rotate. Here, the power source may be an engine 1, and the first input shaft INPUT1 may continuously rotate by the rotational power provided from the engine 1.

The second input shaft INPUT2 may be connected to the power source through the clutch C at one end thereof and selectively receive the rotational power of the power source depending on a coupling or decoupling operation of the clutch C to thereby rotate.

Here, the first input shaft INPUT1 and the second input shaft INPUT2 may be provided on a concentric shaft, and the second input shaft INPUT2 may have a hollow shaft shape, such that the first input shaft INPUT1 may be inserted into the second input shaft INPUT2.

The first counter shaft CNT1 may be connected to the first input shaft INPUT1 through a transfer gear pair.

For example, a first transfer gear pair 3 may include a first input transfer gear 3A provided on the first input shaft INPUT1 and a first output transfer gear 3B provided on the first counter shaft CNT1, as a pair. The first counter shaft CNT1 is connected to the first input shaft INPUT1 through the first input transfer gear 3A and the first output transfer gear 3B which are continuously meshed each other.

Here, the first input transfer gear 3A may be provided to be relatively rotatable with respect to the first input shaft INPUT1 through a one-way clutch OWC to be described below, and the first output transfer gear 3B may also be provided to be relatively rotatable with respect to the first counter shaft CNT1.

The second counter shaft CNT2 may be connected to the second input shaft INPUT2 through another transfer gear pair.

For example, a second transfer gear pair 5 may include a second input transfer gear 5A provided on the second input shaft INPUT2 and a second output transfer gear 5B provided on the second counter shaft CNT2, as a pair. The second counter shaft CNT2 is connected to the second input shaft INPUT2 through the second input transfer gear 5A and the second output transfer gear 5B which are continuously meshed each other.

Here, the second input transfer gear 5A may be provided in a state in which relative rotation thereof with respect to the second input shaft INPUT2 is restricted, and the second output transfer gear 5B may be provided to be relatively rotatable with respect to the second counter shaft CNT2.

The controlling device may select the transfer gear pairs to transfer the rotational power from the first input shaft INPUT1 to the first counter shaft CNT1 or to transfer the rotational power from the second input shaft INPUT2 to the second counter shaft CNT2.

For example, the controlling device may include a first transfer controlling device ST1 to select the first transfer gear pair 3 and a second transfer controlling device ST2 to select the second transfer gear pair 5.

That is, at the time of shifting the vehicle, the transfer gear pairs are coupled to corresponding counter shafts in advance or in a synchronous state using the transfer controlling device, thereby making it possible to change a transfer state of the rotational power of the power source from through a shifting gear pair forming a current shifting stage to through another shifting gear pair forming a target shifting stage.

To this end, the first transfer controlling device ST1 may be provided on the first counter shaft CNT1 and be engaged with and coupled to the first output transfer gear 3B. In addition, the second transfer controlling device ST2 may be provided on the second counter shaft CNT2 and be engaged with and coupled to the second output transfer gear 5B.

In addition, the first transfer controlling device ST1 may be provided on one side or the other side of the first output transfer gear 3B, and the second transfer controlling device ST2 may also be provided at one side or the other side of the second output transfer gear 5B.

For example, the first transfer controlling device ST1 may be provided at one side of the first output transfer gear 3B toward the engine 1, as illustrated in FIG. 1, or be provided at the other side of the first output transfer gear 3B toward the shifting device part 7, although not illustrated in the drawings.

In addition, the second transfer controlling device ST2 may be provided at the other side of the second output transfer gear 5B toward the shifting device part 7, as illustrated in FIG. 1, or be provided at one side of the second output transfer gear 5B toward the engine 1, although not illustrated in the drawings.

As the first transfer controlling device ST1 and the second transfer controlling device ST2 described above, all of controlling devices controlling the power, such as a synchromesh type synchronous device, a dog clutch, a modified dog clutch, a dry/wet clutch, an electric/electronic dry/wet magnet clutch, a coupling, a fluid coupling, a coupling by a spline, and the like, may be used.

Next, the one-way clutch OWC allows the rotational power provided to the first input shaft INPUT1 to be transferred only from the first input shaft INPUT1 toward the first counter shaft CNT1, and blocks the rotational power so as not to be transferred from the first counter shaft CNT1 toward the first input shaft INPUT1.

For example, the one-way clutch OWC may be provided between the first input transfer gear 3A of the first transfer gear pair 3 provided on the first input shaft INPUT1 and the first input shaft INPUT1.

That is, in the case in which a rotational speed of the first input shaft INPUT1 is faster than that of the first input transfer gear 3A, the first input shaft INPUT1 rotates together with the first input transfer gear 3A with driving the first input transfer gear 3A. To the contrary, in the case in which a rotational speed of the first input transfer gear 3A is faster than that of the first input shaft INPUT1, relative rotation of the first input transfer gear 3A is allowed by the one-way clutch OWC, such that a rotational speed difference between the first input shaft INPUT1 and the first input transfer gear 3A may be absorbed.

Although it is preferable to use the one-way clutch OWC as a mechanical device mechanically controlling the power, a mechanical device operated by the same principle as that of the one-way clutch, a component operated by a fluid, a fluid-mechanical composite structure device, a device using electric/electronic force, or the like, may be used.

Next, the shifting device part 7 includes a plurality of shifting gear pairs provided on the first counter shaft CNT1 and an output shaft OUTPUT and on the second counter shaft CNT2 and the output shaft OUTPUT, is configured to select one of the shifting gear pairs appropriate for a driving speed by one of synchronous devices, and transmits the power provided from the power source, that is, the engine 1, to the output shaft OUTPUT.

Here, the output shaft OUTPUT, which is disposed in parallel with the first counter shaft CNT1 and the second counter shaft CNT2, may be disposed on the concentric shaft with the first input shaft INPUT1 and the second input shaft INPUT2. In addition, although not illustrated in the drawings, an output of the output shaft OUTPUT may be increased or decreased through another gear pair, a planetary gear set, or other shifting elements and be then transferred to wheels.

The shifting gear pairs provided in the shifting device part 7 may be configured to include sub-shifting gear pairs and main-shifting gear pairs, and a plurality of sub-shifting gear pairs having different gear ratios may be provided on the first counter shaft CNT1 and the output shaft OUTPUT, and a plurality of main-shifting gear pairs having different gear ratios may be provided on the second counter shaft CNT2 and the output shaft OUTPUT.

Here, the gear pairs may be configured so that the same gear ratios are present between total gear ratios from the first input shaft INPUT1 to the output shaft OUTPUT through the sub-shifting gear pairs and total gear ratios from the second input shaft INPUT2 to the output shaft OUTPUT through the main-shifting gear pairs.

For example, the sub-shifting gear pairs and the main-shifting gear pairs may be configured so that some thereof have the same gear ratio.

Here, the shifting gear pairs having the same gear ratio may be shifting gear pairs having a gear ratio of a specific gear ratio or more, and 1-stage to 3-stage sub-shifting gear pairs GS1 to GS3 and 1-stage to 3-stage main-shifting gear pairs GM1 to GM3 among the shifting gear pairs may be formed to have the same gear ratio respectively, as illustrated in FIG. 1.

In addition, a 4-stage main-shifting gear pair GM4 may have a same gear ratio with a 4-stage sub-shifting gear ratio formed by direct connection between the first input shaft INPUT1 and the output shaft OUTPUT.

The present invention describes a torque assist which is a function that blocks a torque interruption during shifting of a vehicle with providing driving wheels with an assist torque. In an exemplary embodiment of the present invention, the torque assist is accomplished by the sub-shifting gear pairs having the same gear ratios with the main-shifting gear pairs.

Since the torque assist is further required when shifting is made in a low speed driving situation having a relatively low vehicle speed, it may be provided so that sub-shifting gear pairs and main-shifting gear pairs forming relatively low speed shifting stages have the same gear ratios each other. That is, it is possible to determine shift stages between which the torque assist works during shifting through how to include the sub-shifting gear pairs.

For example, in the case of a 5-stage transmission, when shifting stages formed by the main-shifting gear pairs are five stages and shifting stages formed by the sub-shifting gear pairs are four stages, as illustrated in FIG. 1, the torque assist may be implemented during shifting among all of the shifting stages.

On the other hand, although not illustrated in the drawings, when shifting stages formed by the main-shifting gear pairs are five stages and shifting stages formed by the sub-shifting gear pairs are three stages, the torque assist may be implemented only during shifting from a 1-stage to a 4-stage.

In addition, when shifting stages formed by the main-shifting gear pairs are five stages and shifting stages formed by the sub-shifting gear pairs are two stages, the torque assist may be implemented during shifting from a 1-stage to a 3-stage.

Further, in an exemplary embodiment of the present invention, the sub-shifting gear pairs and the main-shifting gear pairs are configured to share output gears provided on the output shaft OUTPUT with each other.

For example, 1-stage, 2-stage, and 3-stage sub-shifting gear pairs GS1, GS2, and GS3 may be provided on the first counter shaft CNT1 and the output shaft OUTPUT, and 1-stage, 2-stage, 3-stage, 4-stage, 5-stage and R-stage main-shifting gear pairs GM1, GM2, GM3, GM4, GM5 and GMR may be provided on the second counter shaft CNT2 and the output shaft OUTPUT. Here, the 1-stage, 2-stage, and 3-stage sub-shifting input gears provided on the first counter shaft CNT1 and 1-stage, 2-stage, and 3-stage main-shifting input gears provided on the second counter shaft CNT2 share the output gears provided on the output shaft OUTPUT with each other, thereby making it possible to form the 1-stage, 2-stage, and 3-stage sub-shifting gear pairs GS1, GS2, and GS3 and the 1-stage, 2-stage, and 3-stage main-shifting gear pairs GM1, GM2, and GM3.

In addition, the synchronous devices may be configured to include a center synchronous device CS provided between the first input shaft INPUT1 and the output shaft OUTPUT so as to be directly connectable to the first input shaft INPUT1 and the output shaft OUTPUT to allow the rotational power transferred to the first input shaft INPUT1 to be directly transferred to the output shaft OUTPUT, and a plurality of synchronous devices selecting the sub-shifting gear pairs and the main-shifting gear pairs.

For example, the center synchronous device CS may be provided on the output shaft OUTPUT and be selectively coupled to the first input transfer gear 3A provided on the first input shaft INPUT1 to implement a gear ratio of 1:1. Preferably, the center synchronous device CS may form the 4-stage sub-shifting gear ratio at the time of being coupled to the first input shaft INPUT1 to transfer the rotational power of the engine to the output shaft OUTPUT.

In addition, the other synchronous devices may be configured to include a 1 and 2-stage sub-shifting synchronous device SS1 and 2 selecting the 1-stage sub-shifting gear pair GS1 or the 2-stage sub-shifting gear pair GS2, a 1 and R-stage main-shifting synchronous device SM1 and R selecting the 1-stage main-shifting gear pair GM1 or the R-stage main-shifting gear pair GMR, a 2 and 5-stage main-shifting synchronous device SM2 and 5 selecting the 2-stage main-shifting gear pair GM2 or the 5-stage main-shifting gear pair GM5, and a 3 and 4-stage main-shifting synchronous device SM3 and 4 selecting the 3-stage main-shifting gear pair GM3 or the 4-stage main-shifting gear pair GM4.

Here, the 1 and 2-stage sub-shifting synchronous device SS1 and 2 may be provided on the first counter shaft, and may be disposed between a sub-shifting input gear and a 2-stage sub-shifting input gear.

In addition, the 1 and R-stage main-shifting synchronous device SM1 and R, the 2 and 5-stage main-shifting synchronous device SM2 and 5, and the 3 and 4-stage main-shifting synchronous device SM3 and 4 may be provided on the second counter shaft CNT2, the 1 and R-stage main-shifting synchronous device SM1 and R may be disposed between a 1-stage main-shifting input gear and a R-stage main-shifting input gear, the 2 and 5-stage main-shifting synchronous device SM2 and 5 may be disposed between a 2-stage main-shifting input gear and a 5-stage main-shifting input gear, and the 3 and 4-stage main-shifting synchronous device SM3 and 4 may be disposed between a 3-stage main-shifting input gear and a 4-stage main-shifting input gear.

Here, although not illustrated in the drawings, a reverse idler gear may be engaged and coupled between an R-stage input gear and an R-stage output gear configuring the R-stage main-shifting gear pair GMR for the purpose of a reverse output.

In addition, although some sub-shifting gear pairs and some main-shifting gear pairs are formed to have the same gear ratio as described above in an exemplary embodiment of the present invention, the sub-shifting gear pairs and the main-shifting gear pairs may be formed to have different gear ratios, and total gear ratios from the first input shaft INPUT1 to the output shaft OUTPUT through the first transfer gear pair and the sub-shifting gear pairs and total gear ratios from the second input shaft INPUT2 to the output shaft OUTPUT through the second transfer gear par and the main-shifting gear pairs are the same as each other.

For example, the shifting gear pairs may be configured so that the same total gear ratios are present between total gear ratios of combined the first transfer gear pair 3 and the sub-shifting gear pairs and total gear ratios of combined the second transfer gear pair 5 and the main-shifting gear pairs.

That is, the shifting gear pairs may be configured so that a total gear ratio obtained by multiplying the gear ratio of the first transfer gear pair 3 by the gear ratio of any one of the sub-shifting gear pairs is the same as another total gear ratio obtained by multiplying the gear ratio of the second transfer gear pair 5 by the gear ratio of any one of the main-shifting gear pairs.

Figure 4:
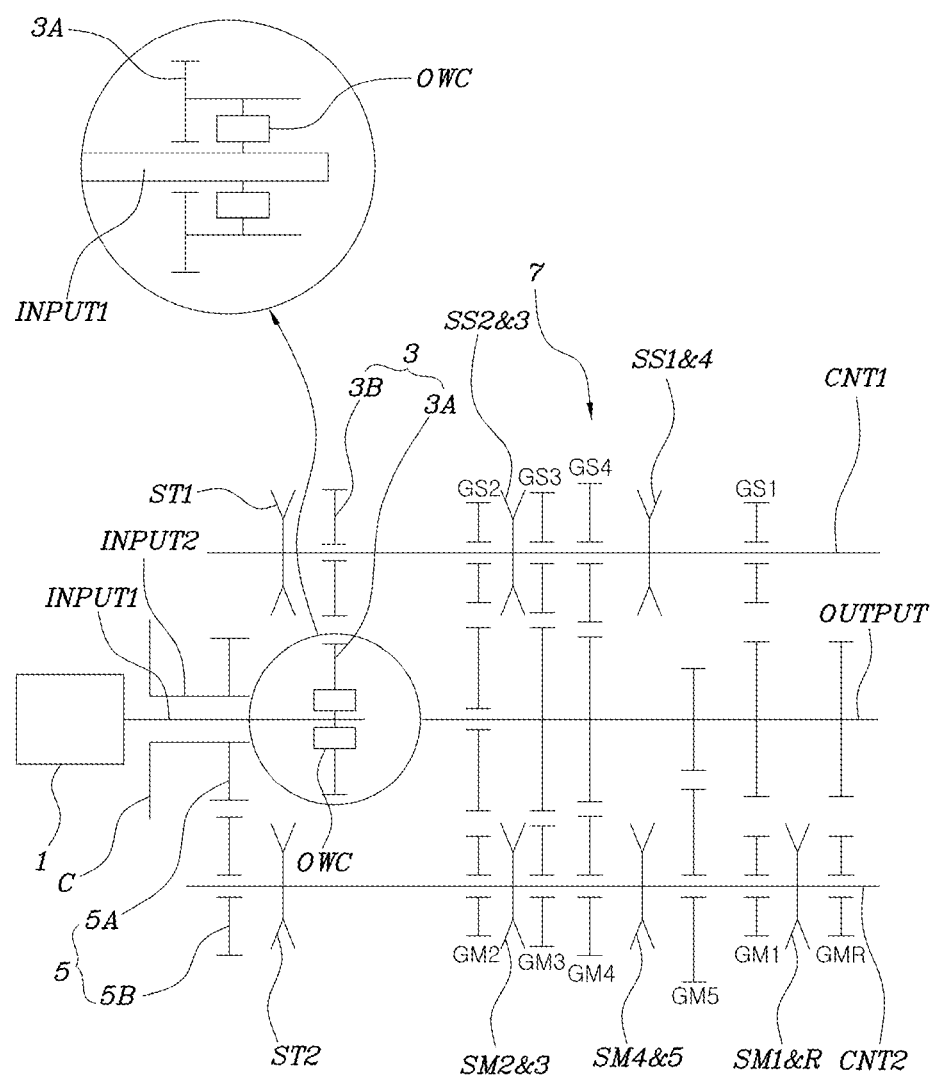
FIG. 4 is an entire structure view illustrating the transmission for a vehicle according to an exemplary embodiment of the present invention in which disposition structures of a shifting gear pair and a synchronous device are changed.

Meanwhile, in an exemplary embodiment of the present invention, the sub-shifting gear pairs, the main-shifting gear pairs, and the synchronous device configuring the shifting device part 7 may be configured as illustrated in FIG. 4.

Referring to FIG. 4, 1-stage to 4-stage sub-shifting gear pairs GS1 to GS4 may be positioned on the first counter shaft CNT1 and the output shaft OUTPUT, and 1-stage to 5-stage and R-stage main-shifting gear pairs GM1 to GM5 and GMR may be positioned on the second counter shaft CNT2 and the output shaft OUTPUT. Here, 1-stage to 4-stage sub-shifting input gears provided on the first counter shaft CNT1 and 1-stage to 4-stage main-shifting input gears provided on the second counter shaft CNT2 share the output gears provided on the output shaft OUTPUT with each other, thereby making it possible to form the 1-stage to 4-stage sub-shifting gear pairs GS1 to GS4 and the 1-stage to 4-stage main-shifting gear pairs GM1 to GM4.

In addition, the synchronous devices may include a plurality of synchronous devices so as to select the sub-shifting gear pairs and the main-shifting gear pairs.

For example, the synchronous devices may be configured to include a 1 and 4-stage sub-shifting synchronous device SS1 and 4 selecting the 1-stage sub-shifting gear pair GS1 or the 4-stage sub-shifting gear pair GS4 and a 2 and 3-stage sub-shifting synchronous device SS2 and 3 selecting the 2-stage sub-shifting gear pair GS2 or the 3-stage sub-shifting gear pair GS3 and further include a 1 and R-stage main-shifting synchronous device SM1 and R selecting the 1-stage main-shifting gear pair GM1 or the R-stage main-shifting gear pair GMR, a 2 and 3-stage main-shifting synchronous device SM2 and 3 selecting the 2-stage main-shifting gear pair GM2 or the 3-stage main-shifting gear pair GM3, and a 4 and 5-stage main-shifting synchronous device SM4 and 5 selecting the 4-stage main-shifting gear pair GM4 or the 5-stage main-shifting gear pair GM5.

Here, the 1 and 4-stage sub-shifting synchronous device SS1 and 4 and the 2 and 3-stage sub-shifting synchronous device SS2 and 3 may be provided on the first counter shaft CNT1, the 1 and 4-stage sub-shifting synchronous device SS1 and 4 may be disposed between a 1-stage sub-shifting input gear and a 2-stage sub-shifting input gear, and the 2 and 3-stage sub-shifting synchronous device SS2 and 3 may be disposed between a 2-stage sub-shifting input gear and a 3-stage sub-shifting input gear.

In addition, the 1 and R-stage main-shifting synchronous device SM1 and R, the 2 and 3-stage main-shifting synchronous device SM2 and 3, and the 4 and 5-stage main-shifting synchronous device SM3 and 4 may be provided on the second counter shaft CNT2, the 1 and R-stage main-shifting synchronous device SM1 and R may be disposed between a 1-stage main-shifting input gear and a R-stage main-shifting input gear, the 2 and 3-stage main-shifting synchronous device SM2 and 3 may be disposed between a 2-stage main-shifting input gear and a 3-stage main-shifting input gear, and the 4 and 5-stage main-shifting synchronous device SM4 and 5 may be disposed between a 4-stage main-shifting input gear and a 5-stage main-shifting input gear.

Here, although not illustrated in the drawings, a reverse idler gear may be engaged and coupled between an R-stage input gear and an R-stage output gear configuring the R-stage main-shifting gear pair GMR for the purpose of a reverse output.

Hereinafter, an action and an effect of the present invention will be described.

A process of shifting a vehicle from an N-stage (neutral stage) to a low speed 1-stage will be described with reference to FIGS. 2A to 2D.

At the time of initial start-up of the vehicle, the first input shaft INPUT1 is directly connected to the engine 1, such that the first transfer gear pair 3 rotates together with the first input shaft INPUT1.

However, in this state, all of the controlling devices in the transmission are in a neutral position, such that a load is not applied to the rotation of the engine 1 regardless of turn-on/off the clutch C.

Figure 2A:
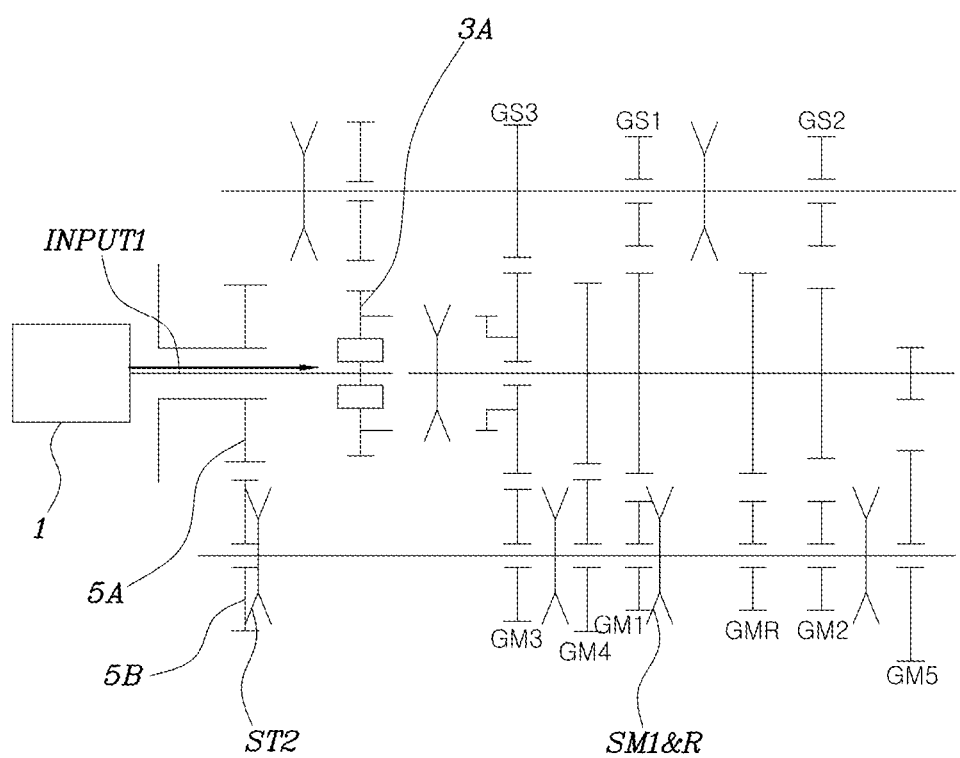
FIG. 2A, FIG. 2B FIG. 2C and FIG. 2D are views for describing a process of shifting a vehicle from an N-stage to a 1-stage by the transmission for a vehicle according to an exemplary embodiment of the present invention.

Then, at the time of starting to shift the vehicle to the 1-stage, first, as illustrated in FIG. 2A, before the clutch C is coupled, the second output transfer gear 5B of the second transfer gear pair 5 is coupled to the second counter shaft CNT2 in advance using the second transfer controlling device ST2 and the 1-stage main-shifting input gear is coupled to the second counter shaft CNT2 in advance using the 1 and R-stage main-shifting synchronous device SM1 and R.

Figure 2B:
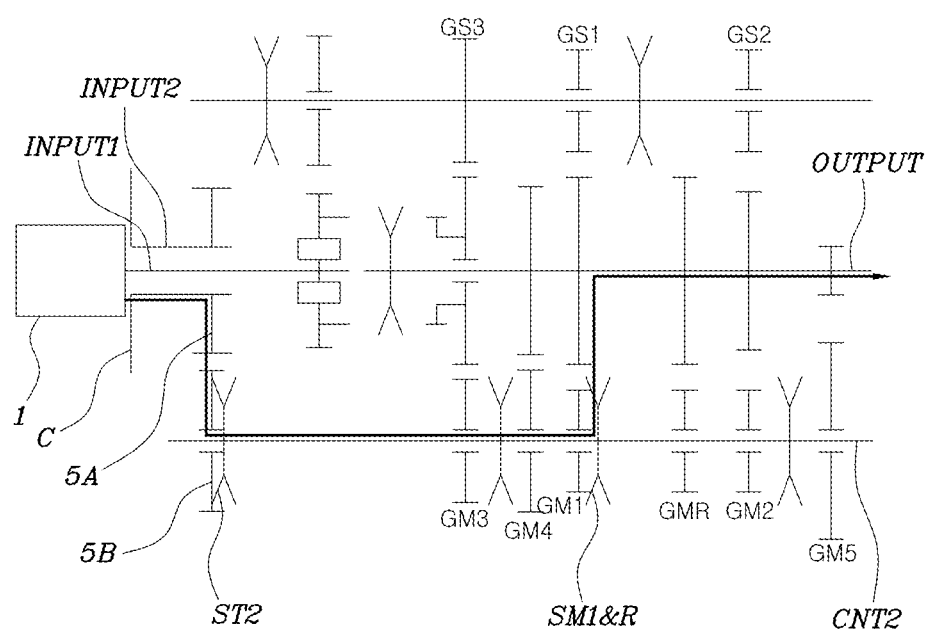

In this state, as illustrated in FIG. 2B, when the clutch C is slowly coupled, the rotational power of the engine 1 starts to be transferred through the second input shaft INPUT2, the power is transferred to the second counter shaft CNT2 through the second transfer gear pair 5, and the 1-stage is formed through the 1-stage main-shifting gear pair GM1, such that the vehicle may be driven at the 1-stage.

Figure 2C:
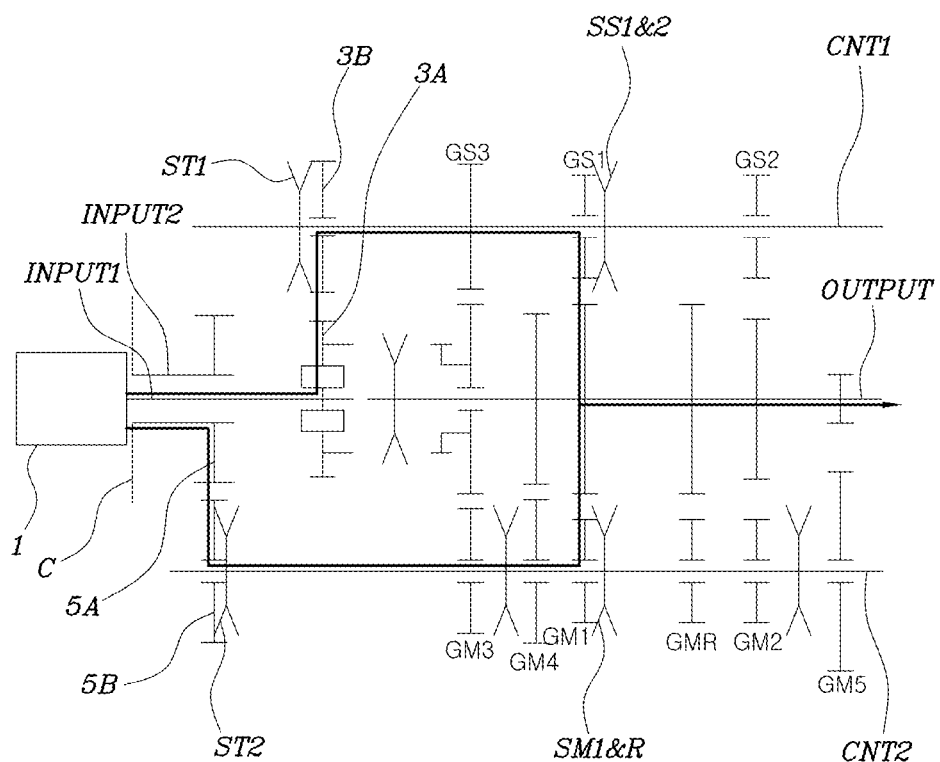

Then, as illustrated in FIG. 2C, the first output transfer gear 3B of the first transfer gear pair 3 is coupled to the first counter shaft CNT1 using the first transfer controlling device ST1, and the 1-stage sub-shifting input gear is coupled to the first counter shaft CNT1 using the 1 and 2-stage sub-shifting synchronous device SS1 and 2.

That is, in case that the 1-stage is formed as illustrated in FIG. 2B, the first input shaft INPUT1 and the second input shaft INPUT2 rotate at the same rotation speed. In this case, the first transfer gear pair 3 and the second transfer gear pair 5 form the same gear ratio, and the 1-stage main-shifting gear pair GM1 and the 1-stage sub-shifting gear pair GS1 also form the same gear ratio.

Therefore, since the rotational speeds of the 1-stage main-shifting gear pair GM1 and the 1-stage sub-shifting gear pair GS1 are synchronous and the rotational speeds of the first transfer gear pair 3 and the second transfer gear pair 5 are synchronous, corresponding controlling devices and synchronous devices may be safely coupled to each other without incurring coupling noise of or a risk of damage to the first transfer gear pair 3 and the 1-stage sub-shifting gear pair GS1.

Figure 2D:
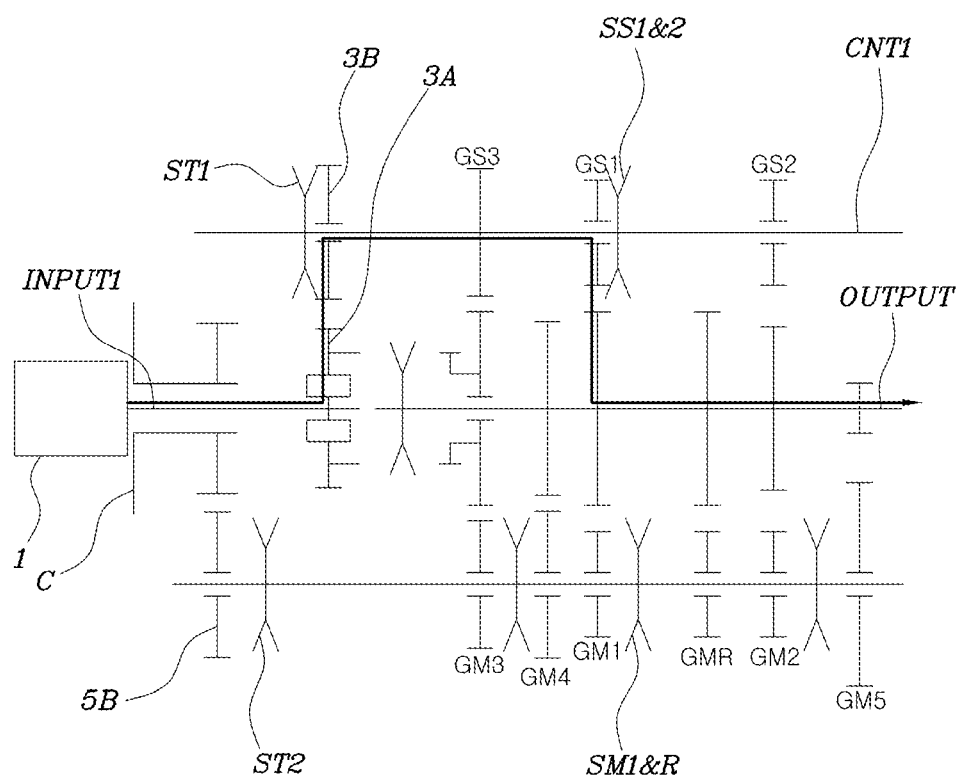

Then, as illustrated in FIG. 2D, the second transfer controlling device ST2 is decoupled from the second transfer gear pair 5, and the 1 and R-stage main-shifting synchronous device SM1 and R is decoupled from the 1-stage main-shifting gear pair GM1. Even though the second transfer gear pair 5 and the 1-stage main-shifting gear pair GM1 are decoupled as described above, since the first input shaft INPUT1 is directly connected to the engine 1, a state in which the rotational power of the engine 1 is transferred to the output shaft OUTPUT through the first transfer gear pair 3, the first counter shaft CNT1, and the 1-stage sub-shifting gear pair GS1 is maintained. Therefore, forward 1-stage driving is possible.

Then, even through the clutch C is released, the rotational power of the engine 1 is still transferred to the output shaft OUTPUT through the first input shaft INPUT1 directly connected to the engine 1 and the first counter shaft CNT1. Therefore, a state in which the 1-stage is formed may be maintained as it is.

Next, a process of shifting the vehicle from a 1-stage to a 2-stage will be described with reference to FIGS. 3A to 3D.

Figure 3A:
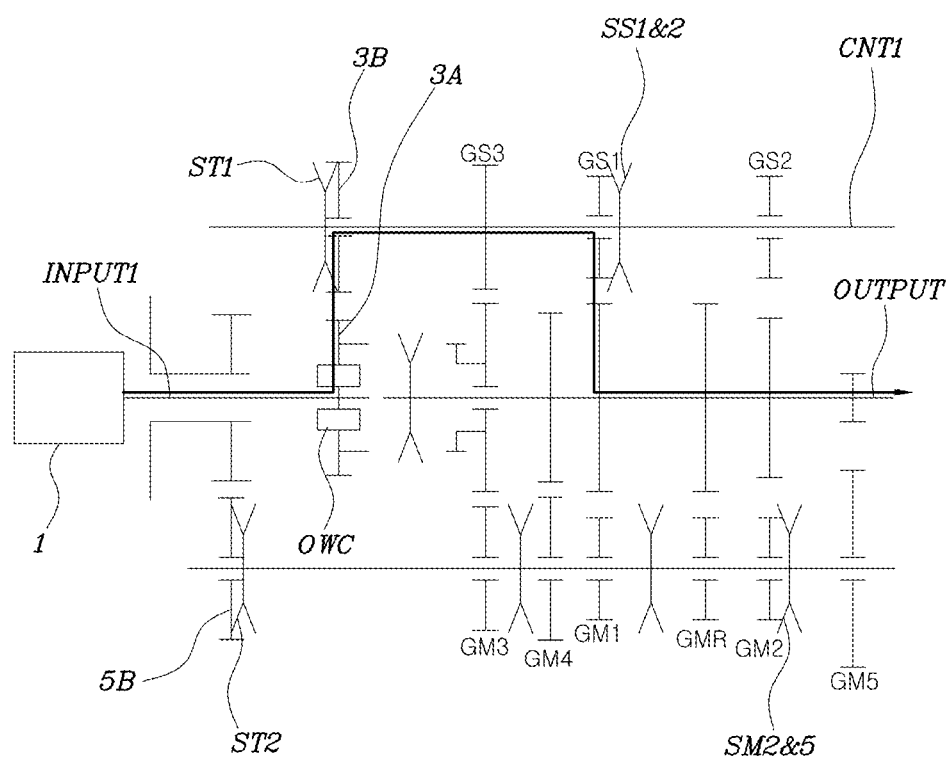
FIG. 3A, FIG. 3B FIG. 3C and FIG. 3D are views for describing a process of shifting a vehicle from a 1-stage to a 2-stage by the transmission for a vehicle according to an exemplary embodiment of the present invention.

At the time of starting to shift the vehicle from the 1-stage to the 2-stage, as illustrated in FIG. 3A, in a state in which the clutch C is released, the second output transfer gear 5B of the second transfer gear pair 5 is coupled to the second counter shaft CNT2 in advance using the second transfer controlling device ST2 and the 2-stage main-shifting input gear is coupled to the second counter shaft CNT2 in advance using the 2 and 5-stage main-shifting synchronous device SM2 and 5.

Figure 3B:
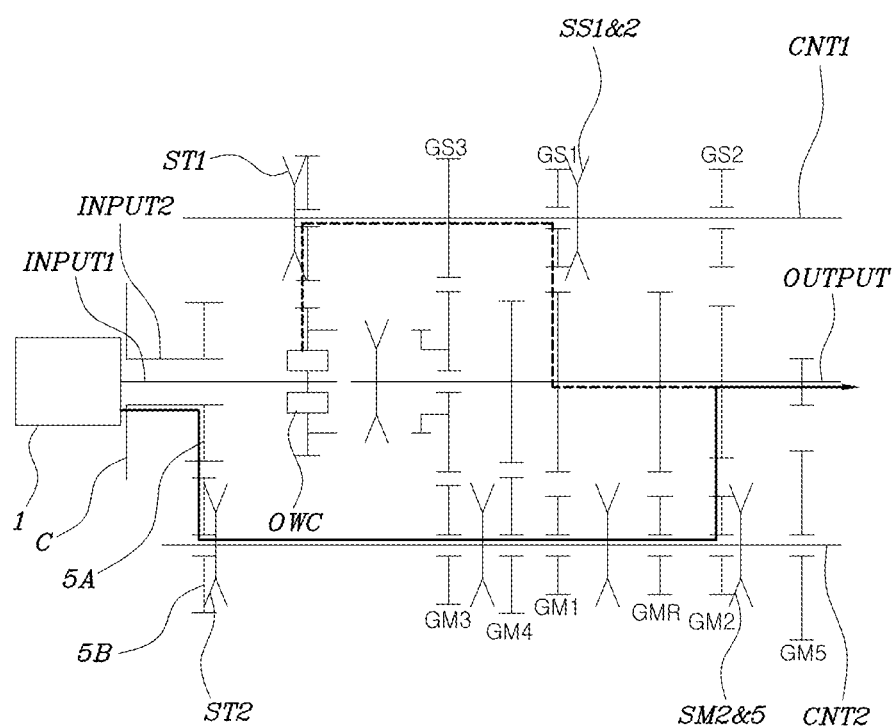

In this state, as illustrated in FIG. 3B, when the clutch C is slowly coupled, the rotational power of the engine 1 starts to be transferred through the second input shaft INPUT2, the power is transferred to the second counter shaft CNT2 through the second transfer gear pair 5, and the 2-stage is formed through the 2-stage main-shifting gear pair GM2, such that the vehicle may be driven at the 2-stage.

In this case, before the clutch C is coupled, the first transfer gear pair 3 and the 1-stage sub-shifting gear pair GS1 are coupled to each other, such that the vehicle is driven in the 1-stage. However, as the clutch C is coupled, the vehicle is shifted to the 2-stage through the second transfer gear pair 5 and the 2-stage main-shifting gear pair GM2.

However, in this case, the one-way clutch OWC allows and absorbs a difference in a rotational speed generated since the first counter shaft CNT1 rotates at a speed faster than that of the first input shaft INPUT1 due to a difference in a gear ratio between the 1-stage sub-shifting gear pair GS1 and the 2-stage main-shifting gear pair GM2, thereby preventing the rotational power of the engine from being transferred from the first counter shaft CNT1 to the first input shaft INPUT1.

Therefore, in the process of shifting the vehicle from the 1-stage to the 2-stage, a flow of the power transferred from the first counter shaft CNT1 to the output shaft OUTPUT is smoothly changed to another flow of the power transferred from the second counter shaft CNT2 to the output shaft OUTPUT through a control of slip coupling of the clutch C and allowance of relative rotation of the one way clutch OWC, thereby preventing a shifting quality deterioration phenomenon, a torque interruption, felt as if the vehicle is drawn during being shifted.

Figure 3C:
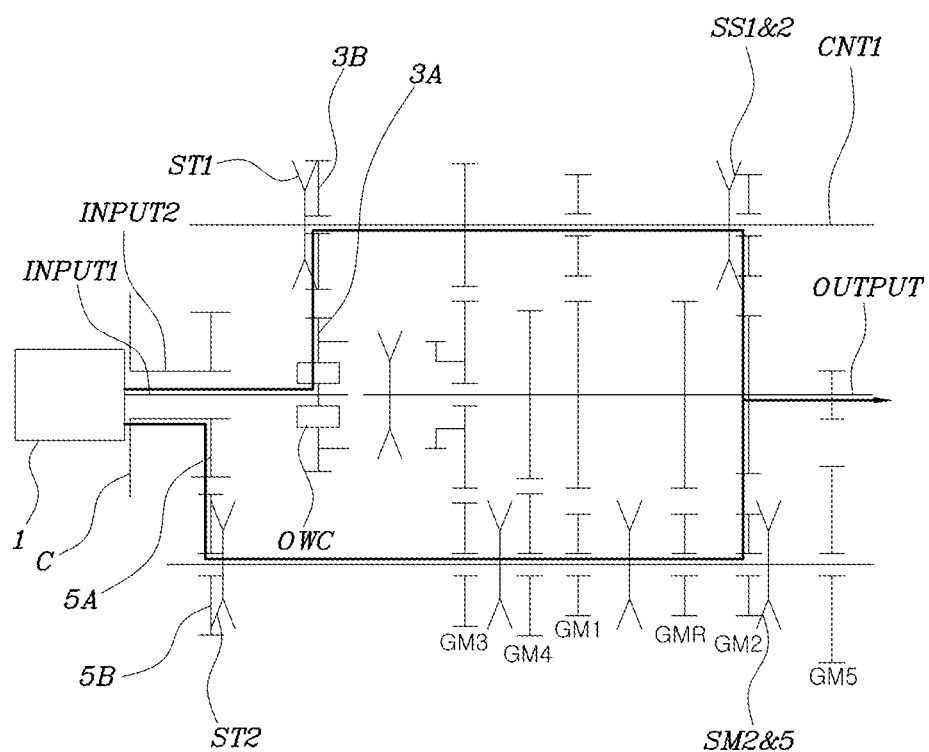

Then, as illustrated in FIG. 3C, the first output transfer gear 3B of the first transfer gear pair 3 is coupled to the first counter shaft CNT1 using the first transfer controlling device ST1, and the 2-stage sub-shifting input gear is coupled to the first counter shaft CNT1 using the 1 and 2-stage sub-shifting synchronous device SS1 and 2.

That is, as illustrated in FIG. 3B, in the case in which 2-stage is formed, such that the vehicle is driven at the 2-stage, the first input shaft INPUT1 and the second input shaft INPUT2 rotate at the same rotation speed. In this case, the first transfer gear pair 3 and the second transfer gear pair 5 form the same gear ratio, and the 2-stage main-shifting gear pair GM2 and the 2-stage sub-shifting gear pair GS2 also form the same gear ratio.

Therefore, since the rotational speeds of the 2-stage main-shifting gear pair GM2 and the 2-stage sub-shifting gear pair GS2 are synchronous and the rotational speeds of the first transfer gear pair 3 and the second transfer gear pair 5 are synchronous, corresponding controlling devices and synchronous devices may be safely coupled to each other without incurring coupling noise of or a risk of damage to the first transfer gear pair 3 and the 2-stage sub-shifting gear pair GS2.

Figure 3D:
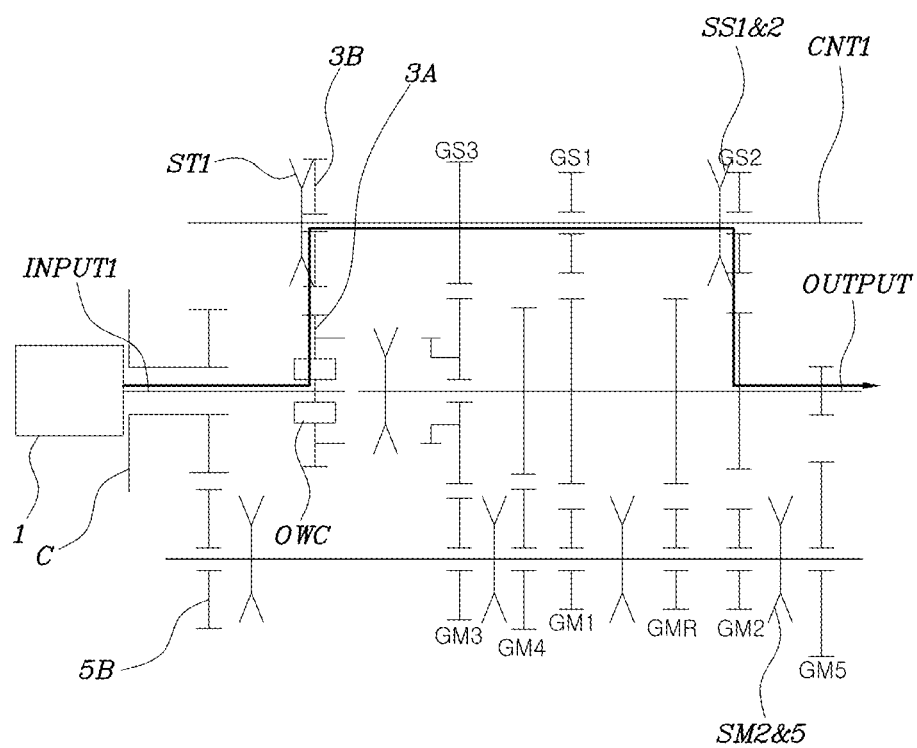

Then, as illustrated in FIG. 3D, the second transfer controlling device ST2 is decoupled from the second transfer gear pair 5, and the 2 and 5-stage main-shifting synchronous device SM2 and 5 is decoupled from the 2-stage main-shifting gear pair GM2. Even though the second transfer gear pair 5 and the 2-stage main-shifting gear pair GM2 are decoupled as described above, since the first input shaft INPUT1 is directly connected to the engine 1, a state in which the rotational power of the engine 1 is transferred to the output shaft OUTPUT through the first transfer gear pair 3, the first counter shaft CNT1, and the 2-stage sub-shifting gear pair GS2 is maintained. Therefore, forward 2-stage driving is possible.

Then, even the clutch C is released, the rotational power of the engine 1 is still transferred to the output shaft OUTPUT through the first input shaft INPUT1 directly connected to the engine 1 and the first counter shaft CNT1. Therefore, a state in which the 2-stage is formed may be maintained as it is.

In addition, also in the case of remaining shifting stages, shifting may be performed through the same shifting operation as the above-mentioned shifting operation.

As described above, according to an exemplary embodiment of the present invention, the rotational power of the engine 1 transferred to the output shaft OUTPUT at a specific shifting stage is smoothly shifted and changed to the output shaft OUTPUT through a control of slip coupling of the clutch C and allowance of relative rotation of the one way clutch OWC in a process of shifting the vehicle to a target shifting stage, thereby preventing a shifting quality deterioration phenomenon felt as if the vehicle is drawn during being shifted.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission for a vehicle, comprising:
   a first input shaft continuously receiving rotational power from a power source;
   a second input shaft selectively receiving the rotational power of the power source through a clutch;
   a first counter shaft and a second counter shaft connected to the first input shaft and the second input shaft through transfer gear pairs, respectively;
   a controlling device selecting one of the transfer gear pairs to transfer the rotational power from the first input shaft to the first counter shaft or to transfer the rotational power from the second input shaft to the second counter shaft;
a one-way clutch allowing the rotational power provided to the first input shaft to be transferred only from the first input shaft toward the first counter shaft; and
a shifting device part including a plurality of shifting gear pairs, selecting one of the shifting gear pairs appropriate for a driving speed by one of synchronous devices, and transmitting the power provided from the power source to an output shaft,
wherein the shifting gear pairs include:
a plurality of sub-shifting gear pairs provided on the first counter shaft and the output shaft to have different gear ratios; and
a plurality of main-shifting gear pairs provided on the second counter shaft and the output shaft to have different gear ratios,
the shifting gear pairs are configured so that same gear ratios are present between total gear ratios from the first input shaft to the output shaft through the sub-shifting gear pairs and total gear ratios from the second input shaft to the output shaft through the main-shifting gear pairs, and
the synchronous devices include a center synchronous device provided between the first input shaft and the output shaft to be directly connectable to the first input shaft and the output shaft to allow the rotational power transferred to the first input shaft to be directly transferred to the output shaft.

2. The transmission for a vehicle of claim 1, wherein the one-way clutch is provided between the first input shaft and an input transfer gear forming a transfer gear pair of the transfer gear pairs provided on the first input shaft.

3. The transmission for a vehicle of claim 1, wherein the transfer gear pairs includes:
a first transfer gear pair including a first input transfer gear of the first input shaft and a first output transfer gear of the first counter shaft provided as a pair; and
a second transfer gear pair including a second input transfer gear of the second input shaft and a second output transfer gear of the second counter shaft provided as a pair, and
the controlling device includes:
a first transfer controlling device to select the first transfer gear pair; and
a second transfer controlling device to select the second transfer gear pair.

4. The transmission for a vehicle of claim 3, wherein the first transfer controlling device is provided on the first counter shaft and is engaged with and coupled to the first output transfer gear, and
the second transfer controlling device is provided on the second counter shaft and is engaged with and coupled to the second output transfer gear.

5. The transmission for a vehicle of claim 3, wherein the shifting gear pairs are configured so that same gear ratios are present between total gear ratios of combined the first transfer gear pair and the sub-shifting gear pairs and total gear ratios of combined the second transfer gear pair and the main-shifting gear pairs.

6. The transmission for a vehicle of claim 1, wherein the sub-shifting gear pairs and the main-shifting gear pairs include shifting gear pairs having a same gear ratio therebetween.

7. The transmission for a vehicle of claim 6, wherein the shifting gear pairs having a same gear ratio are shifting gear pairs having a predetermined gear ratio or more.

8. The transmission for a vehicle of claim 6, wherein the sub-shifting gear pairs and the main-shifting gear pairs are configured to share output gears provided on the output shaft with each other.

9. The transmission for a vehicle of claim 1, wherein the center synchronous device is provided on the output shaft and is selectively coupled to the first input shaft to implement a gear ratio of 1:1.

10. The transmission for a vehicle of claim 9, wherein the synchronous devices include:
a 1 and 2-stage sub-shifting synchronous device selecting a 1-stage sub-shifting gear pair or a 2-stage sub-shifting gear pair;
a 1 and R-stage main-shifting synchronous device selecting a 1-stage main-shifting gear pair or an R-stage main-shifting gear pair;
a 2 and 5-stage main-shifting synchronous device selecting a 2-stage main-shifting gear pair or a 5-stage main-shifting gear pair; and
a 3 and 4-stage main-shifting synchronous device selecting a 3-stage main-shifting gear pair or a 4-stage main-shifting gear pair, and
the center synchronous device selects a 3-stage sub-shifting gear pair or is coupled to the first input shaft to implement 4-stage sub-shifting.

* * * * *